(12) United States Patent
Gudmundsson et al.

(10) Patent No.: US 9,805,403 B2
(45) Date of Patent: Oct. 31, 2017

(54) EFFICIENTLY AUTHORIZING CUSTOMERS FOR PRODUCTS UNDER DIFFERENT AUTHORIZATION CONDITIONS

(71) Applicant: Verizon Patent and Licensing Inc., Arlington, VA (US)

(72) Inventors: Agust Kr. Gudmundsson, Hackettstown, NJ (US); Edward L. Demaria, Highland Mills, NY (US); Maria Cel Halili Zaballero, Ramsey, NJ (US); Gregory R. Lambros, Somers, NY (US); Mathivanan S. Munikrishnan, Somerset, NJ (US); Kalyani Devu, Belle Mead, NJ (US); Adil Belihomji, Kendall Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 679 days.

(21) Appl. No.: 14/292,400

(22) Filed: May 30, 2014

(65) Prior Publication Data
US 2015/0348149 A1  Dec. 3, 2015

(51) Int. Cl.
*G06Q 30/06* (2012.01)

(52) U.S. Cl.
CPC .................... *G06Q 30/0609* (2013.01)

(58) Field of Classification Search
CPC .................... G06Q 30/06; G06Q 20/405
USPC ........................................................ 705/26.1
See application file for complete search history.

(56) References Cited

U.S. PATENT DOCUMENTS

| | | | |
|---|---|---|---|
| 2007/0055672 A1* | 3/2007 | Stevens | G06F 17/3087 |
| 2007/0143601 A1* | 6/2007 | Arroyo | G06F 21/6218 |
| | | | 713/166 |
| 2010/0232593 A1* | 9/2010 | Ku | H04L 29/1216 |
| | | | 379/220.01 |
| 2014/0040975 A1* | 2/2014 | Raleigh | H04W 12/12 |
| | | | 726/1 |

* cited by examiner

*Primary Examiner* — Mila Airapetian

(57) ABSTRACT

Customers seeking to acquire new products or services may need to be authorized for the new products or services. The authorization can depend on customer and product information, as well as on different authorization conditions such as qualification, re-qualification, and eligibility conditions. To efficiently authorize a customer for products or services under different authorization conditions, a table stores authorization rules including flags associating the rules with particular authorization conditions. Hence, among the rules that pertain to authorizing the customer for a product or service, one subset of rules can be associated with one authorization condition while a different subset is associated with another authorization condition. The customer is selectively determined to be authorized for the product or service under an authorization condition when the product or service information and/or the customer information satisfy all of the rules associated with the selected authorization condition.

18 Claims, 4 Drawing Sheets

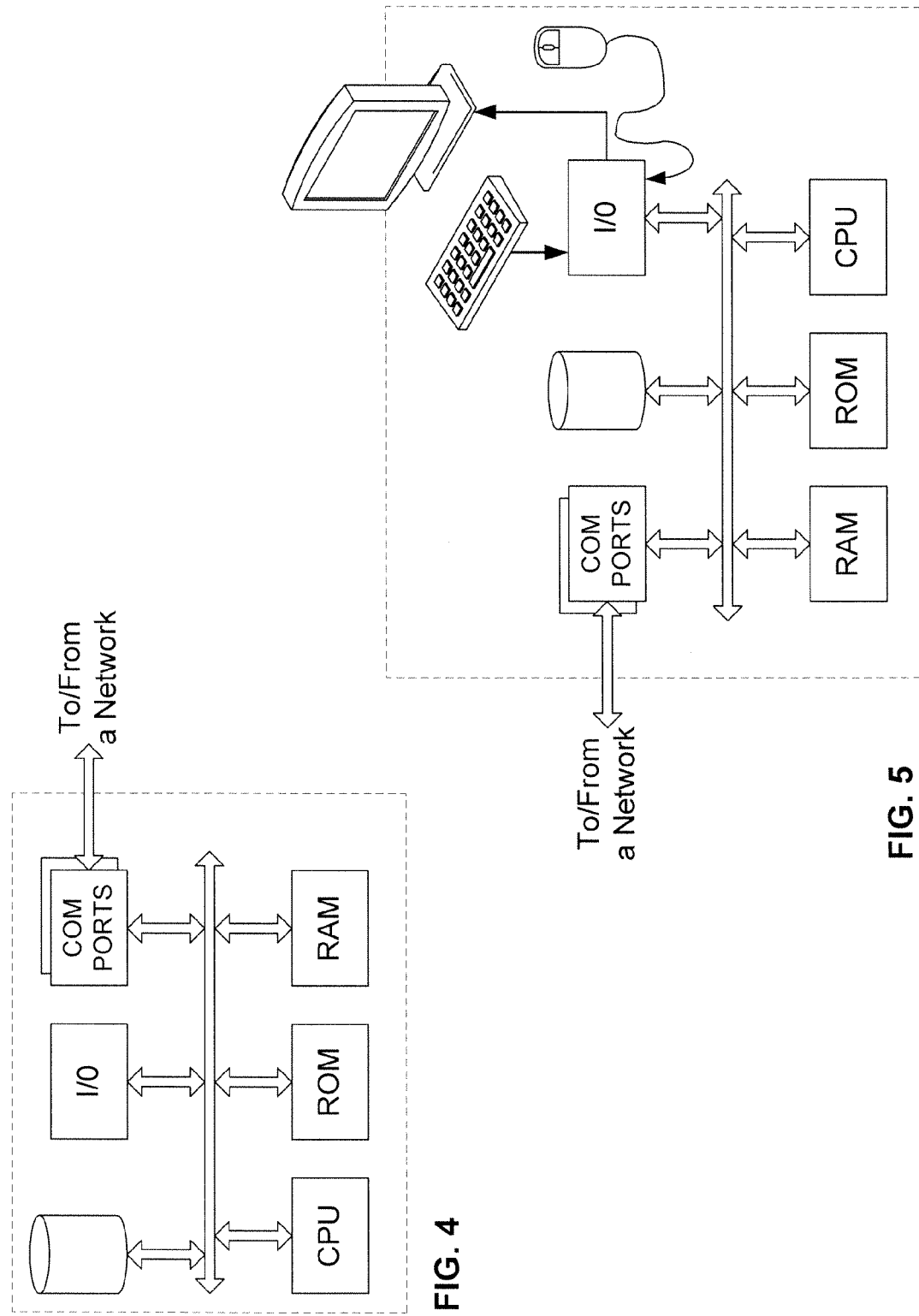

EFFICIENTLY AUTHORIZING CUSTOMERS FOR PRODUCTS UNDER DIFFERENT AUTHORIZATION CONDITIONS

BACKGROUND

Retailers and service providers increasingly provide different products or services to different customers. For example, a retailer or service provider may want to provide a particular product or service (or a particular promotion or pricing for a product or service) only to selected customers. The selected customers may be customers who are members of a loyalty program, who are previous or repeat customers, who already own specific products or services from the retailer or service provider, or the like.

In the illustrative case of mobile service providers, the determination of whether a particular product or service (including a promotion or price) should be offered to a customer involves a large number of interdependent evaluation criteria, such as whether the customer is a new or existing customer; the customer's current service plans or devices; the service plans, devices, or upgrades required for the new product or service; whether the product or service is a new purchase or an upgrade or replacement; whether the customer is of a type entitled to a discount; or the like.

Because of the large number of factors that need to be evaluated to determine whether a particular product or service should be offered to a customer, and because of the interrelatedness of these factors, the computational effort necessary to make such determinations using conventional processing approaches is significant. A need therefore exists for a more efficient manner of authorizing customers for particular products or services.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 is a simplified functional block diagram of a computer that may be configured as a host or server, for example, to function as the authorization server in the system of FIG. 1.

FIG. 5 is a simplified functional block diagram of a personal computer or other work station or terminal device.

DETAILED DESCRIPTION

Figure 1:
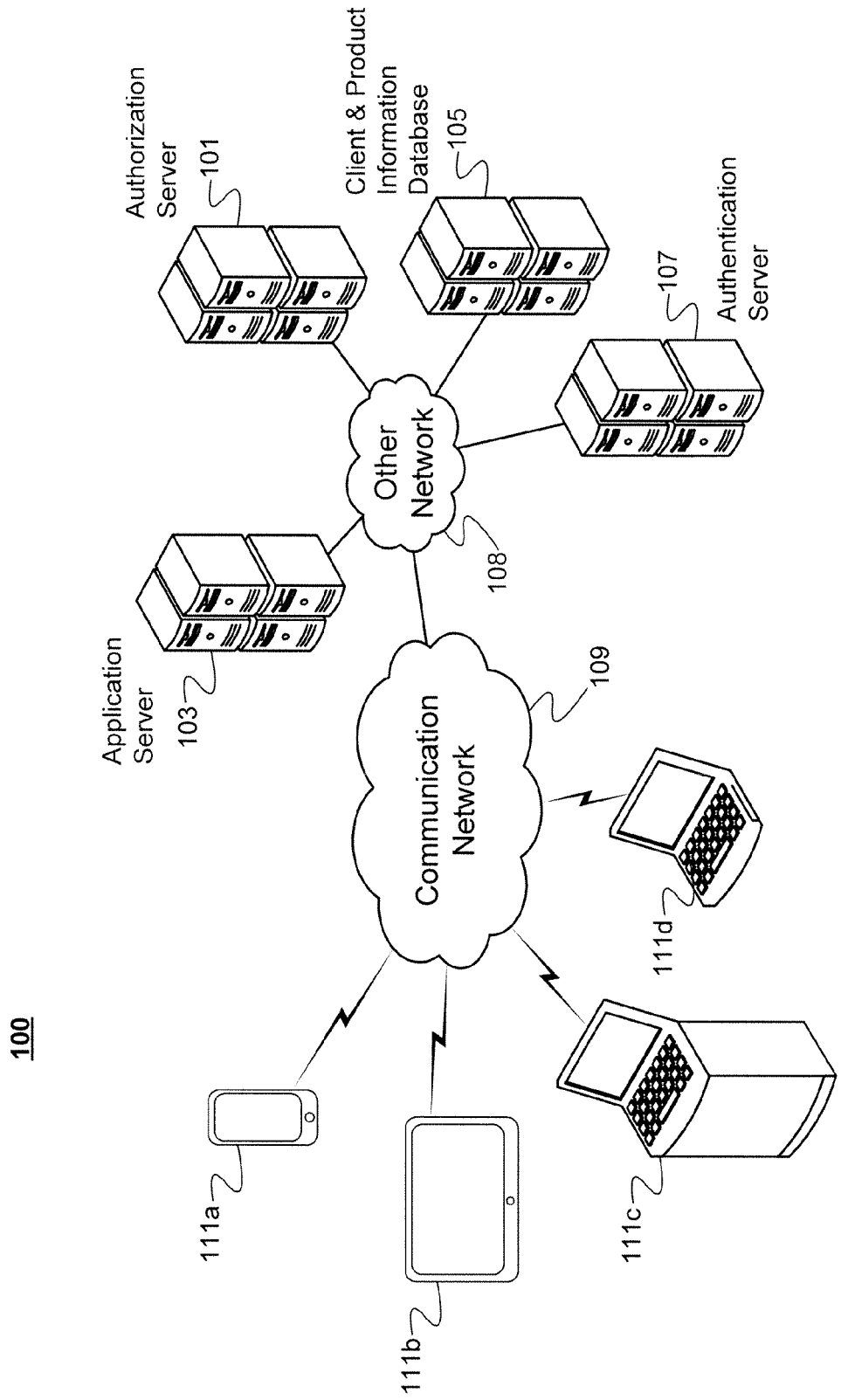
FIG. 1 is a high-level functional block diagram of an example of a system of networks/devices that provide communication and processing for providing the product authorization service.

In the following detailed description, numerous specific details are set forth by way of examples in order to provide a thorough understanding of the relevant teachings. However, the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to efficiently authorizing customers for products or services under different authorization conditions.

Customers seeking to acquire new products or services may need to be authorized for the new products or services. For example, a customer seeking to acquire a new product or service from a mobile wireless carrier, such as a new wireless service plan, an updated wireless communication device, or the like, commonly needs to be authorized by the mobile wireless carrier for the purchase of the product or service. The authorization process can enable the mobile wireless carrier to make certain products or services available only to selected customers (e.g., current customers, members of a loyalty program, or the like), or to impose requirements on customers wanting particular products or services (e.g., a data subscription service plan can be required for a user to be authorized for purchase of a smart-phone). The authorization process, however, typically requires a large number of customer-related factors to be evaluated with respect to authorization rules pertaining to many different products and services, and including some factors and rules that may be dependent on each other. As a result, the authorization process is a computationally expensive process. For example, a particular wireless service plan (e.g., a service offered by the mobile wireless carrier) may be made available only to current customers of the mobile wireless carrier that are upgrading from non-smartphone wireless device to a smartphone wireless device. In such an example, the authorization requires verifying that the customer's current subscription status, determining whether the customer has a non-smartphone wireless device that is eligible for an upgrade, and identify among all wireless devices offered by the carrier those smartphone wireless devices to offer to the customer in relation to the selected wireless service plan. More complex situations arise in cases involving customers having multiple wireless devices of different types, wireless service plans requiring customers to have various combinations of wireless devices associated with their accounts, and the like.

The criteria that must be satisfied for the customer to receive authorization for a particular product or service may depend on an authorization condition—such that different authorization criteria can be imposed under different authorization conditions. For example, the criteria for authorizing a customer for a particular product or service may depend on whether the product or service is part of a new purchase or subscription for the customer (e.g., a qualification condition), a change in subscription or circumstances of the customer (e.g., a requalification condition in which it is determined whether a customer can keep an existing product based on changes to the account), or a determination of which of the customer's products or services are eligible for a service (e.g., an eligibility condition).

The authorization of the customer for the new product or service can be performed using a table of authorization rules, also referenced herein as a Rule-Set Map Table. The table includes a plurality of entries (e.g., rows of the table) each associating an authorization rule with a particular rule-set. Each entry further includes one or more flags indicating the particular authorization condition(s) under which the entry (and associated rule) should be applied. Thus, if the entry includes a flag for a particular authorization condition (e.g., a qualification event), the associated rule is applied when performing an authorization under the associated condition. However, if the entry does not include a flag for a particular authorization condition, the associated rule is not applied when performing the authorization even though the entry is associated with the rule-set being applied. In general, if an entry includes a flag for a particular authorization condition, the associated rule must be satisfied in order for the rule-set to be satisfied. In contrast, if the entry does not include a flag for a particular authorization condition, the associated rule need not be satisfied in order for the rule-set to be satisfied even if the associated rule forms part of the rule-set under another authorization condition.

As such, despite the fact that different authorization criteria apply under the different authorization conditions, a single table of authorization rules can be used to efficiently perform authorizations under all authorization conditions.

Reference now is made in detail to the examples illustrated in the accompanying drawings and discussed below.

FIG. 1 illustrates a system 100 configured to provide efficient customer authorizations in response to receiving authorization requests. The system 100 includes an authorization server 101 that performs the customer authorization based on information included in an authorization request. In this respect, the authorization server 101 functions as a conditioning rules engine operative to provide product and/or service authorizations in response to received authorization requests. The customer authorization is further performed based on information retrieved by the authorization server 101 from a client and product information database 105 communicatively connected to the authorization server 101 via a communication network 108. The network 108 can be a private network, such as a network operated by a retailer or service provider of products and services for which authorization is provided. The network 108 can alternatively be any private or public network, or an interconnection of multiple networks. The authorization server 101 communicates via the network 108 with the client and product information database 105, as well as with various other systems and servers used for providing the authorization service.

The authorization server 101 typically receives authorization requests via the network 108. The authorization requests can be received from an application server 103 that provides application services to users including authorization-related services. For example, the application server 103 can provide a web-based or network-based application service to users, such as an online store application or service, a user-account management application or service, or the like. The application server 103 may request customer authorization information from the authorization server 101 in order to provide the authorization-related information to a user of the application or service provided by the server 103. The authorization server 101 may additionally or alternatively receive authorization requests directly from user devices, such as a mobile device 111a, a tablet computer 111b, a kiosk 111c, or a personal computer 111d. In some implementations, the authorization requests can also be generated in the authorization server 101 itself, for example through subroutine calls or direct calls to an authorization database.

The user devices 111a-d communicate with the authorization server 101 and application server 103 via a communication network 109 communicatively connected to network 108. The communication network 109 takes the form of a wired or wireless network, or an interconnection of two or more wired or wireless networks. In various examples, the communication network 109 includes a mobile wireless network providing mobile wireless service to mobile devices 111a, a Wi-Fi network providing communication services to tablet computers 111b and portable computers 111d via the Internet, a local area network (LAN) providing wired network connectivity to a kiosk 111c, and/or the like.

In operation, a user of a mobile device 111a, a tablet computer 111b, a kiosk 111c, or a personal computer 111d causes the authorization request to be generated and sent to the authorization server 101. The user may be the customer for whom authorization information is sought, an employee or representative of the retailer or service provider than is assisting a customer for whom authorization information is sought, or the like. In one example, the user is a customer accessing a user-account management application running on the user's mobile device 111a or personal computer 111d, accessing an online store application using a kiosk 111c provided in a retail store, or the like. In another example, the user is a salesperson accessing a retail-support application running on a tablet computer 111b to provide authorization information for a customer in the retail store. In other cases, the user is accessing a web-based application provided by the application server 103 and accessed by the user via a web-browser application running on a user device 111a-d. In each of these situations, the user accesses an application executing on the user device 111a-d, or executing on the application server 103 via a user interface provided on the user device 111a-d. The application obtains identification information from the user, the identification information including a unique identifier for the user and, optionally, a password, or information providing basic user information (e.g., information identifying a new/potential customer). The application then generates and transmits the authorization request including the identification information to the authorization server 101.

As part of providing authorization services, the authorization server 101 can communicate with an authentication server 107 to ensure that authorization information is provided only to authenticated users by authenticating identifying information (including passwords) received in authorization requests. While servers 101, 103, 105, and 107 are illustratively shown as separate stand-alone computers in FIG. 1, the servers can be implemented on a single computer (e.g., as server applications executing on the computer) or implemented in a distributed fashion across multiple servers, for example to increase the processing throughput of the servers.

The operation of the authorization server 101 will be described in more detail with reference to FIG. 2.

Figure 2:
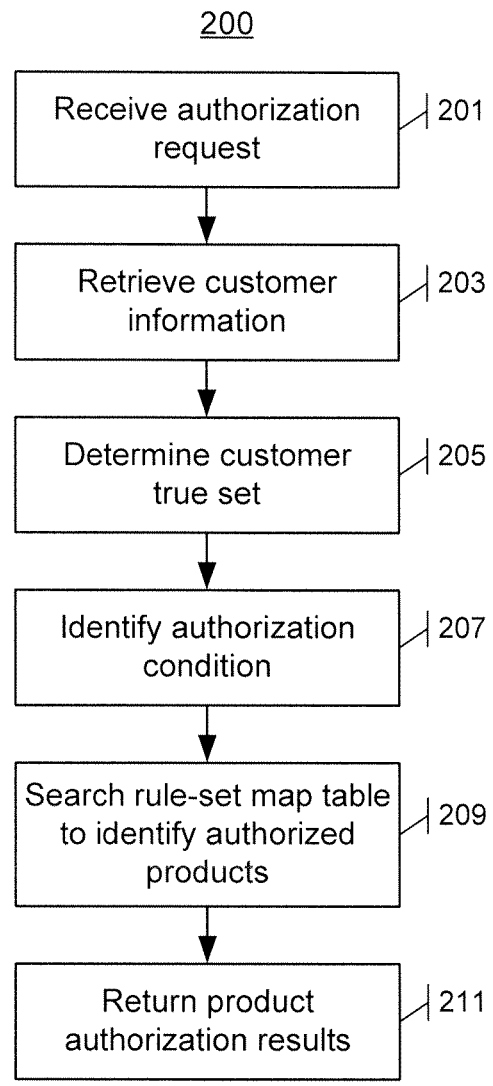
FIG. 2 is a general flow diagram illustratively showing processing performed in the authorization server of FIG. 1 as part of providing the product authorization service.

FIG. 2 is a general flow diagram illustratively showing processing performed in the authorization server 101 as part of providing the authorization service. The method 200 begins in step 201 with the authorization server 101 receiving an authorization request. The authorization request includes customer identification information such as an account number or other unique identifier associated with the customer, or information identifying the customer as a new/potential customer. In cases in which the authorization request includes customer identification information, the request can include a password used by the authorization server 101 to authenticate the customer. In situations in which a password is received, the authorization server can provide the customer identification information and password to the authentication server 107 to verify the identity of the customer prior to providing authorization services. In some examples, the authorization request includes identification of one or more specific products for which the customer seeks to obtain authorization. In cases in which no specific products are identified in the request, the authorization server 101 performs authorization for all products so as to provide to the customer information on those products for which the customer is authorized.

In general, the authorization request received in step 201 additionally identifies one or more authorization conditions according to which the authorization should be performed. The authorization condition can correspond to the type of transaction that the customer wants to engage in and for which authorization is sought. For example, the authorization condition can correspond to a qualification condition in situations in which the customer wants to determine if he is authorized to newly acquire or newly subscribe to a particular product or service (e.g., as a purchase, or as an upgrade or replacement of service or equipment). The authorization condition can alternatively correspond to a re-qualification condition in situations in which the customer wants to determine if she can retain a previously acquired product or a currently subscribed service in spite of a change in the customer's account status or condition (e.g., the customer changing his home address, discontinuing a line of service or de-activating a device, or the like). Finally, the authorization condition can correspond to an eligibility condition in situations in which the customer wants to determine which of the customer's products or services (e.g., products or services that the customer has previously acquired or currently subscribes to) can be used with a new product or service (e.g., which of the customer's devices are eligible to use an unlimited data-communication package).

In response to receiving the authorization request, the authorization server 101 retrieves customer information in step 203. When the authorization request includes customer identification information, the authorization server 101 retrieves user-account and/or user-profile information associated with the customer identified in the request from the client and product information database 105. The user-account and/or user-profile information can include address information, information on the user's current products or services, and the like. When the authorization request identifies the customer as a new/potential customer, the authorization server 101 may optionally retrieve account and/or profile information for a default user from the database 105. In step 203, the server 101 can additionally prompt the user having caused the request to be generated for additional user information. For example in the case of a new customer, the server 101 may prompt the user for information on the user's home location, the user's credit or financial profile (e.g., credit score), and/or the types of products or services that the user is interested in. The additional user information can then be used as part of authorizing the new/potential customer for products and services. As part of step 203, the authorization server 101 can additionally retrieve product or service information from the client and product information database 105. For example, the authorization server 101 may retrieve information about product or services that the customer currently has (or currently subscribes to), such as the products or services identified in the customer's user-account or user-profile information. The authorization server 101 may alternatively or additionally retrieve information about products or services that the customer is interested in (e.g., a product or service identified in the authorization request received in step 201, and for which the customer seeks authorization), and/or products or services that are currently offered for sale to the customer.

The authorization server 101 stores a number of rules used as part of the authorization process to identify customers that satisfy particular criteria. Each rule has one or more criteria associated with it, and one or more operations used to determine whether the rule is satisfied. In step 205, the authorization server 101 proceeds to determine a customer true-set. The true set is determined based on the customer information, and based on the set of rules stored by the authorization server 101. As part of step 205, the authorization server 101 evaluates the rules relative to the customer information to identify those rules that evaluate as "true" for the customer based on the customer information. Certain rules pertain to customer type (e.g., new vs. existing customer) or customer affiliation (e.g., is customer part of a group entitled to a discount, promotion, or access to particular products). One such rule may evaluate as "true" for a new customer, while a different rule may evaluate as "true" for an existing customer. Other rules pertain to location, for example a customer's home location (e.g., in the North East, in the Mid-West, . . . ). A rule may evaluate as "true" for customers with billing addresses in the North East, while another rule may evaluate as "true" for customer with billing addresses in the North East or in the South East. Further rules may identify the type of service plan the customer is currently subscribed to, indicate whether the customer is currently locked-in to the plan, indicate whether the customer is eligible for an equipment upgrade, identify devices that the customer currently has enabled for service, and the like.

The customer true-set can include account-level and line-level attributes that evaluated as true in step 205. Account-level attributes are attributes include attributes such as a billing address, a customer type, or the like, that apply generally to the account of a customer and to all lines of service associated with the account. Line-level attributes are attributes that pertain to a specific line of service, but not necessarily apply to all lines of services associated with the account. Line-level attributes can include whether a specific line of service is associated with a tablet computer, whether a specific line of service is eligible for an equipment upgrade, or the like. In the customer true-set, account-level attributes are identified with a '0' line identifier, while line-level attributes are identified with the associate service line identifier.

In turn, in step 207, the authorization server 101 determines the authorization condition for which the customer authorization should be performed. Different authorization conditions can be defined for different situations. In general, the authorization request received in step 201 identifies the authorization condition that should be applied. In general, in situations in which no authorization condition is identified in the request, a default authorization condition can be selected. In some situations, the default authorization condition is fixed and remains the same under all conditions. In such a situation, the "qualify" condition may for example serve as the default authorization condition that is selected when the authorization request does not specify any condition to be applied. In other situations, however, the default authorization changes based on either conditions that are independent of the customer (e.g., time, location) or conditions that are user-based (e.g., particular type of account, or usage). In the other situation, the default authorization condition may be the "qualify" condition when the authorization request pertains to a new customer or an existing customer that is eligible for an upgrade, while the default authorization condition may be the "requalify" condition when the authorization request pertains to an existing customer that is not eligible for an upgrade (e.g., an existing customer who is currently locked-in to a 2-year service contract).

The different authorization conditions determine the set of rules that should be satisfied in order to authorize a customer for a particular product. Each authorization condition can therefore identify a different set of rules (and/or a sub-set of rules) that should be satisfied by a same customer for a same product under each condition. The association between rules and products are stored by the authorization server 101 in the form of multiple (e.g. two) tables. A rule-set map table defines sets of rules that are associated together to form rule-sets. Each rule-set includes one or more of the rules stored by the authorization server 101 and that should be satisfied in order for the rule-set to be satisfied. The rule-set map table, however, further includes flags identifying the rule(s) in each rule-set that must be satisfied under each authorization condition for the rule-set to be satisfied under the authorization condition. Hence, among the rules included in a rule-set, flags can identify two (or more) different sub-sets of the rules that are generally required to be satisfied for the rule-set to be considered to be satisfied under the corresponding authorization condition.

In addition to the rule-set map table, the authorization server 101 stores a product rule-set map that associates with different products or services the rule-sets that should be satisfied to cause the product or service to be satisfied. In general, when multiple rule-sets are associated with a product or service in the product rule-set map, the product is authorized if any one or more of the associated rule-sets is satisfied. The product or service, however, is not authorized if none of the associated rule-sets is satisfied.

In step 209, the authorization server 101 thus searches the rule-set map table for products that are authorized for customers having the true-set determined in step 205 under the authorization condition identified in step 207. Once the search is performed, the search results are returned in step 211 by the authorization server 101 to the device from which the request was received in step 201. In one example, the search results are returned to the application server 103, while in other examples, the search results are returned to the user devices 111a-d.

In one example, step 209 is a two-step process. In a first step, the rule-set(s) of the rule-set map table that are satisfied by the true-set (determined in step 205) under the selected authorization condition (identified in step 207) are identified. Next, in a second step, the products associated with the identified/satisfied rule-set(s) are determined using the product rule-set map table. The determined products are then returned by the authorization server 101.

In another example, in step 209, the one or more rule-set(s) associated a selected product or service are identified using the product rule-set map table in a first step. The selected product or service may be a product or service that the user currently has or subscribes to, or a user-selected product or service for which eligibility should be determined. In a second step, the rules that are associated with the rule-set(s) identified in the first step under the selected authorization condition are retrieved. Finally, the retrieved rules are used to identify those lines of service of the customer that are eligible for the selected product or service.

An illustrative example of an authorization process will now be described to further illustrate the functioning of the conditioning rules engine. In the example, a customer's record is comprised of many attributes, some of which apply to the customer record as a whole (e.g., customer type, billing address, and credit information) while others apply to individual lines of service associated with the customer record (e.g., a phone number, a device associated with the phone number or line of service, etc.). A customer may have many lines attached to the account. Each line has specific attributes, for example features, device type, device identifier, and other attributes specific to the device.

A simplified customer record for an illustrative customer having 3 mobile phones and two tablets could include the following information:

```
{ Customer_id=12345, name="John Doe", address="123 Main St, Hometown, NJ, 07123",
    Type=Regular, account level features={ {International calling, $10}, {10GB share everything,
        promo one, $50} },
    Line={ id=123456789, mdn=9085551212, device=iphone 5s, features={3-way call, voicemail,
        PMMS} },
    Line={ id=123456790, mdn=9085551213, device=maxx, features={3-way call, voicemail, MMS } },
    Line={ id=123456792, mdn=9085551214, device=LG50, features={3-way call, voicemail, SMS} },
    Line={ id=123456999, device=ipad, features={ SMS, {NFL Special,$5} } },
    Line={ id=234567890, device=aircard, features={static IP, $5} } }
```

In the example, the customer record is retrieved by the authorization server 101 from the client and product information database 105 in step 203, and is processed in step 205 to extract relevant information, apply rules, and determine the true set for the customer.

The set of rules applied in step 205 each respectively correspond to a condition that needs to be met by a customer record (or by a line of the customer record) for the rule to evaluate as "true." Rules can therefore be based on billing address information, device type, customer type, subscription plan or features active on a line, or the like. To apply an illustrative rule that describes an area as South or North East, the system examines the billing address and evaluates the rule as "true" if the billing address lists a state in the South or North East (e.g., Florida or New Jersey) or evaluates as "false" for other states (e.g., North Dakota or Oregon). The processing for location-based rules may rely on state identifiers, or on zip code information for more detailed information.

More generally, rules might be mapped to actual values. A rule can thus be described as having a criterion to examine, a set of values to look for, and an operation to apply to those values (e.g., equal to, not equal to, less than, greater than, within a specified range, or the like). For operations like "greater than," the rule includes only a single value for comparison; however, for an "equal to" operation, the rule can include a list of many values and evaluate as true if any of the listed values are matched. To facilitate reuse, once a rule is defined, a unique identifier Rule ID is assigned to the rule.

The rules can be organized into two tables: a parent table and a criteria value table. The parent table identifies the Rule ID, and descriptions of the rule, of the operation to be performed, and of the criterion to be evaluated. In this example, the parent table lists 5 rules:

TABLE 1

| Rule Table | | | |
|---|---|---|---|
| Rule ID | Description | Oper. | Criterion |
| 111 | Fed and Regular | = | Cust. Type |
| 222 | 4G Tab | = | Device |
| 333 | 3G&4G Tab | = | Device |
| 444 | MW and East | = | Area |
| 555 | West Area | = | Area |

The second table, the criteria value table, includes a plurality of entries each associated with a Rule ID. Each entry corresponds to a criterion that causes a rule to evaluate as "true," and the table can include multiple entries associated with a same Rule ID. Thus, if at least one entry associated with the Rule ID is true for a particular customer, the rule evaluates as "true." As such, Rule ID=111 evaluates as true if the customer is a regular customer or a federal customer, and evaluates as false if the customer is neither a regular customer nor a federal customer. In the criteria value table, effective and end dates can also be defined in case a criterion is only valid during one or more certain timeframe(s). For example in the illustrative table below, the MW criterion for Rule ID=444 is only valid during the year 2014, after which time the only valid criteria for Rule ID=444 are NE and SE (which were also valid during 2014 and remain valid until Dec. 31, 2015). Note that after Dec. 31, 2015, Rule ID=444 will always evaluate as false in the example since no areas will be valid at that time.

TABLE 2

| Rule Criteria Value Table | | | |
|---|---|---|---|
| Rule ID | Value | Effective Date | End Date |
| 111 | Regular | | |
| 111 | Federal | | |
| 222 | 4G Tablet | | |
| 333 | 3G Tablet | | |
| 333 | 4G Tablet | | |
| 444 | NE | | Dec. 31, 2015 |
| 444 | SE | | Dec. 31, 2015 |
| 444 | MW | Jan. 1, 2014 | Dec. 31, 2014 |
| 555 | NW | | |
| 555 | SW | | |

Tables 1 and 2 are used to identify all rules that a particular customer satisfies. For example, in the case of the illustrative customer having 3 mobile phones and two tablets identified above, the evaluation of the customer profile in view of the rules listed in the rule table (Table 1) and rule criteria value table (Table 2) (such as the evaluation performed in step 205) is used to determine the customer's true set. The evaluation results in assembling the set of all rules that are true into a temporary table or map (e.g., the customer true set table). The customer true set table contains an entry for each rule that evaluates as true. The customer true-set table can include account-level and line-level attributes that evaluated as true. As such, each entry in the table additionally identifies whether the rule evaluates as true for the customer's account or for a particular line of service. In the case of rules pertaining to particular line(s) of service, the true-set table includes an identifier for each line of service for which the rule evaluates as true. The Line ID is set to "0" for rules that evaluate as true at the account-level, and is set to the Line ID for rules pertaining to particular lines. If a rule pertaining to line(s) of service evaluates as true for multiple different lines, the customer true-set table includes a separate entry for each line of service for which the rule evaluated as true. In some examples, the customer true set can be simplified by including only a single entry with the line ID set to "0" if a rule pertaining to line(s) of service evaluates as true for all lines of service of the account; in other examples, however, the customer true-set table includes a separate entry for each line of service associated with a rule pertaining to pertaining to line(s) of service even if the rule evaluates as true for all lines of service of the account:

TABLE 3

| Customer True Set | |
|---|---|
| Line ID | Rule ID |
| 0 | 111 |
| 123456999 | 222 |
| 123456999 | 333 |
| 0 | 444 |

Each product (including physical products as well as services) offered by the retailer or service provider has an associated Product ID which serves as a unique identifier for the product or service. The product also generally has a name, and can further optionally have a description, price, and other information associated therewith. The Product ID is stored in a product table along with a corresponding product name:

TABLE 4

| Product Table | |
|---|---|
| Product ID | Product Name |
| 5555 | Plan A |
| 6666 | Plan B |

In addition, each product is further associated with one or more rules forming a rule-set. The association between a product (and more specifically, the product's Product ID) and the rule-set (identified by the rule-set ID) is stored in the product rule-set map. The product rule-set map can take the form of a table in which each entry corresponds to a product/rule-set pair identifying the rule-set that must be satisfied in order to be authorized for the product. The product rule-set map can further include effective and end dates if the product/rule-set pair is only valid for a particular time interval, or no effective and end dates if the product/rule-set pair is always valid:

TABLE 5

| Product Rule-set Map | | | |
|---|---|---|---|
| Product ID | Rule-Set ID | Effective Date | End Date |
| 5555 | 1122 | Jan. 1, 2012 | Dec. 31, 2099 |
| 5555 | 1133 | Jan. 1, 2012 | Dec. 31, 2099 |
| 6666 | 1122 | Mar. 3, 2013 | Dec. 31, 2099 |

As shown in the product rule-set map, a particular product (and corresponding Product ID) can be associated with multiple different rule-sets. For example, Product ID 5555 is associated with two different rule-sets: 1122 and 1133. Because the product is associated with two different rule-sets, the product can be offered to customers satisfying any of the associated rule-sets. Thus, Product ID 5555 can be offered to customers satisfying rule-set 1122 only, rule-set 1133 only, or both rule-sets 1122 and 1133. Additionally, a rule-set can be associated to any number of products, and the same rule-set can therefore be included in multiple different entries of the product rule-set map. The rule-set can thus be readily reused for any number of products. As shown, the rule-set 1122 is associated with both product 5555 and product 6666.

Finally, the rule-sets are defined through two tables. A rule-set is defined as a set of individual rules and/or conditions that must all evaluate as true in order to satisfy the rule-set. A rule-set may thus include one or more rules. Additionally, each rule in the rule-set can be associated with various conditions under which the rule is applied and needs to be satisfied. The conditions can include the three illustrative conditions detailed above: the "qualify," "re-qualify," and "eligibility" conditions. A rule can thus always be applied as part of the rule-set, or the rule can be applied only under one or more specified conditions.

In one example, authorization for a product may be dependent on the customer performing an upgrade. The authorization for the product may thus be dependent on the type of device that a customer currently has, and the rule-set associated with the product thus includes a rule relating to the current device of the customer. Such a rule, however, will only be applied under a "qualify" condition. Indeed, neither the "re-qualify" nor the "eligibility" conditions relate to upgrades, and therefore applying the rule in these conditions would not make sense. As such, the rule-set indicates in the rule-set map table that the rule relating to upgrades applies only under the specified "qualify" condition.

More generally, when a rule-set is defined, each rule can be marked or flagged to identify one or more conditions under which the rule is applied. This allows for a single rule-set to be used under multiple different conditions. In our qualification/re-qualification/eligibility example, a single rule-set can be used to define when a product is available for sale, and which subset of rules are used to evaluate if a customer still qualifies later, during post order processing. In addition, the rule-set may be used to determine eligibility or availability (or both), to allow for additional flexibility of processing. This conditional processing within the rule-set happens based on the condition being evaluated. As such, new criteria are evaluated in the same way as previous criteria when a new suite of attributes needs to be considered in rules processing.

The rule-set is defined through two tables: a rule-set table and a rule-set map table. The rule-set table identifies the Rule-Set ID (a unique identifier for a rule-set) and a description of the rule-set. The rule-set table can further include effective and end dates if the rule-set is only valid for a particular time interval, or no effective and/or end date if the rule-set is valid for an open period of time:

TABLE 6

Rule-Set Table

| Rule-Set ID | Description | Effective Date | End Date |
|---|---|---|---|
| 1122 | East Coast Tablet Rule | Jan. 1, 2012 | |
| 1133 | West Coast Tablet Rule | Jan. 1, 2012 | |

The rule-set map table identifies the set of rules that are included in each rule-set. As such, each entry of the rule-set map table corresponds to a rule-set/rule pair. A rule-set is satisfied only if each of the entries associated with the rule-set are satisfied. However, each entry of the rule-set map table can include one or more flags identifying one or more conditions under which the rule is applied. In evaluating a rule-set under a particular condition, only those rules associated with the condition are applied. As such, the rule-set is satisfied only if each of the entries associated with the rule-set under the specified condition are satisfied. As in other tables described above, the rule-set map table can further include an expiry date identifying if a particular entry (and associated rule) in the rule-set is only applied during a particular time interval, or no expiry date if the rule is applied all the time:

TABLE 7

Rule-Set Map Table

| Rule-Set ID | Rule ID | Qualify | Eligibility | Expiry Date |
|---|---|---|---|---|
| 1122 | 111 | B | | |
| 1122 | 444 | Q | | Dec. 31, 2015 |
| 1122 | 333 | B | Y | |
| 1133 | 111 | B | | |
| 1133 | 222 | B | Y | |
| 1133 | 555 | Q | | |

In the illustrative rule-set map table (table 7) shown above, the Qualify flag marker is used to identify if a rule is applied when a person is qualifying ("Q") for a product, when the person is requalifying ("R"), under both ("B") conditions. For example, if a product is only made available to customers residing in the Northeast (i.e., customers satisfying rule 444 in rule-set 1122), and the customer can retain the product if he later moves away from the Northeast (e.g., triggering a re-qualification event), then the corresponding entry is given a flag Q to indicate that the rule is applied only under qualifying conditions. However, if the rule is applied (and thus needs to be satisfied) under both qualifying and re-qualifying conditions (e.g., as in the case of rule 111 in rule-set 1122), then the corresponding entry is given flag value of B.

In addition, certain rules can be used to identify whether a line is eligible for using (i.e., can be used in concert with) the product. For instance, if a product is specially designed for use with tablets (e.g., a tablet service plan providing 10 GB of data transmission specifically for tablets), a separate flag can be used to identify the rule as pertaining to eligibility. In the example of Table 7, rule 333 in Rule-set 1122 is a rule used to determine the eligibility of tablets, and a separate flag "Y" is used to identify the rule as such.

The rule-set map table can have numerous entries, notably in situations in which a large number of rule-sets are defined and in which individual rule-sets include numerous rules. In one implementation example of the system described herein, the system includes 3,000-4,000 individual rules that are evaluated based on at least 65 different elements of a customer profile that determine whether the rules each evaluate as true or false. Furthermore, the rules are organized into around 60,000 rule-sets that each include approximately 3-8 rules (with an average of less than 4 rules per rule-set). Furthermore, the rule-set map table can be subject to large numbers of search operations in response to receiving numerous customer authorization requests. Requests may average around 5 million authorization requests per day, with peak loads of 200-300 requests per second. Thus, in order to ensure that the rule-set map table can be efficiently searched, the table is designed to only contain integer pairings (e.g., between Rule-Set IDs and Rule IDs) so that database queries can be optimized.

The rule-set map table is used to identify products for which a customer is authorized. For example, following completion of step 205 and the populating of a customer true set table as detailed above, the authorization server 101 can search the rule-set map table for authorized products in step 209.

As detailed above in relation to the illustrative example presented herein, the rule-set map can be searched under three illustrative conditions: the "qualify," "re-qualify," and "eligibility" conditions. The qualify condition applies in the case of performing an authorization to identify products that a customer is authorized to purchase, for example to display the products to the customer. The qualify condition can also be applied in a situation in which a customer has chosen a product for purchase, and a final authorization verification is performed to ensure that the customer is authorized for the product. The re-qualify condition can be applied to verify that a customer is still authorized for a previously purchased product in response to the customer making an account-related change (e.g., moving addresses; adding or remove a line of service, subscription plan, device; or the like). Once the customer has purchased a product, the eligibility condition is applied to identify which of the customer's service lines can be authorized for use with the product. Under each different condition, the rule-set table is filtered to identify only those rules in each rule-set that need to be satisfied to satisfy the rule-set.

Figure 3A:
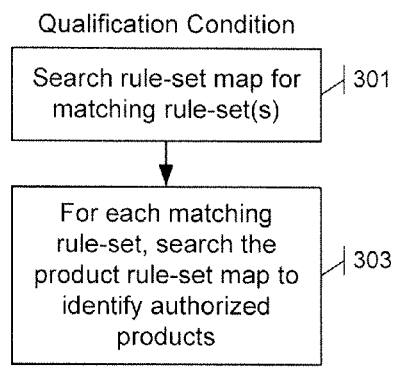
FIGS. 3A-3C are flow diagrams showing processing performed in the authorization server as part of providing the product authorization service in accordance with the processing of FIG. 2.
Figure 3B:
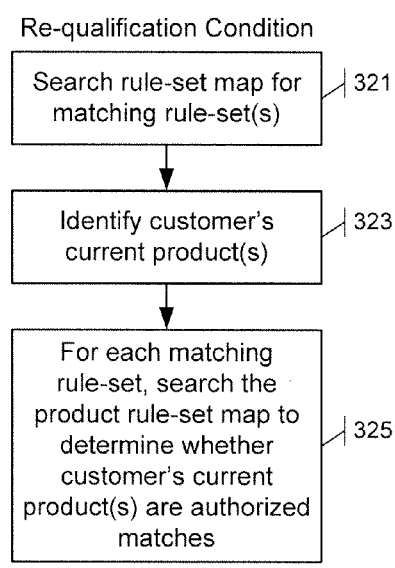
Figure 3C:
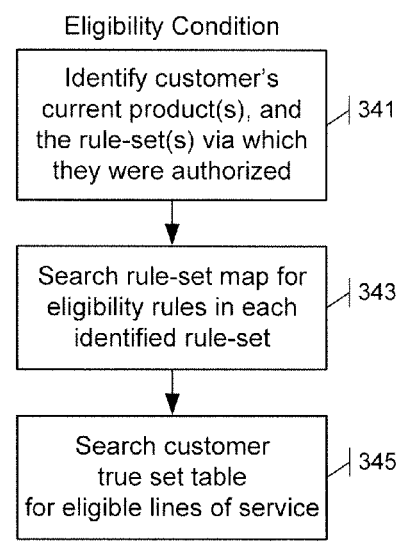

The detailed processing performed in step 209 under each authorization condition is detailed in a respective one of FIGS. 3A-3C. FIGS. 3A-3C are general flow diagrams illustratively showing processing steps performed in the authorization server 101 as part of the authorization process under the "qualify," "re-qualify," and "eligibility" conditions respectively.

Upon identifying in step 207 that a "qualify" condition applies, the authorization server 101 proceeds to step 209 to perform the process of method 300 of FIG. 3A. Following on the example of the customer true set table shown in Table 3 above, the search of the rule-set map table is performed in step 301. In the present example, the search of the rule-set map table seeks to identify one or more rule-sets in which each entry of the rule-set that is associated with the qualify condition (i.e., rows with the flags "Q" or "B") evaluate as true. In view of the customer true set table including rules with Rule IDs 111, 222, 333, and 444 as having been satisfied, the search of the rule-set map table shown above at Table 7 returns rule-set 1122(that requires satisfying rules 111, 444, and 333). In contrast, rule-set 1133 is not returned since it requires rules 111, 222, and 555, which are not all included in the customer's true set table (in this case, rule 555 is determined to have not been satisfied). In turn, the product rule-set map is searched to identify authorized products in step 303, the authorized products corresponding to products associated with the rule-set identified as being satisfied in step 301 (i.e., rule-set 1122). The product with Product ID=5555 is returned, along with the product with Product ID=6666 if the current date is after Mar. 3, 2013.

In an illustrative example, the method 200 may be triggered by a user accessing a website (e.g., an online store website) of a mobile wireless carrier via a computer to obtain information on potential equipment purchases and upgrades. The website may be provided via the application server 103. If the user is a current customer of the mobile wireless carrier, the user provides identification information (e.g., a username and password) to access the user's account on the website. Alternatively, the user identification information can be automatically retrieved (e.g., based on the identity of the device, such as a mobile device, from which the user is accessing the website). Once logged in to the website, the user can select an option to receive information on the user's upgrade eligibility. Selection of the option triggers method 200 under the "qualification" condition (leading to method 300 being performed as part of step 209). Specifically, upon determining that the user has selected the upgrade eligibility menu option, the application server 103 generates and transmits to the authorization server 101 a product authorization request identifying the user. In response to receiving the request, the authorization server 101 performs method 200 under the "qualify" condition and returns, in step 211, a list of products that the user is authorized to purchase. The application server 103 generates a display screen for display to the user via the website identifying the products that the user is authorized for.

Alternatively, upon identifying in step 207 that a "re-qualify" condition applies, the authorization server proceeds to step 209 to perform the process of method 320 of FIG. 3B. Under this condition, the search of the rule-set map table seeks to identify a rule-set in which each entry of the rule-set that is associated with the re-qualify condition (i.e., rows with the flags "R" or "B") evaluate as true. In view of the customer true set table listing rules with Rule IDs 111, 222, 333, and 444 of the example detailed above, the search of the rule-set map table shown above at Table 7 returns rule-sets 1122 (requiring rules 111 and 333 to be satisfied under the re-qualification condition) and 1133 (requiring rules 111 and 222 to be satisfied under the re-qualification condition) in step 321. In the case of a re-qualification, the search of the product rule-set map can be limited to searching only for products that the customer already has (e.g., products included in the customer's information retrieved in step 203), since only the customer's current products are concerned with re-qualification authorization statuses. The processing thus identifies the customer's current product(s) (notably product 5555, in the present example) in step 323. In turn, in step 325, the product rule-set map table is searched to identify products that are both associated with the rule-set returned in step 321 and are among the customer's current products as determined in step 203. Thus, in response to searching the product rule-set map table in step 325, the product with Product ID=5555 is returned. The product with Product ID=6666 is not considered in the matching in step 325 since the customer does not already have the product with Product ID=6666, and the question of re-qualification for the product with Product ID=6666 is therefore irrelevant.

In one example, the user may access a mobile wireless service account website provided by application server 103 to update customer information associated with the customer's account. For example, the user may update the postal address associated with the user's account because the user is moving to a new home. Upon the user updating the account-related information, the application server 103 automatically triggers a "re-qualification" verification to ensure that all of the customer's products and services re-qualify in view of the change to the user's information. As a result of the trigger, the application server 103 generates and transmits to the authorization server 101 a "re-qualification" authorization request identifying the user. In response to receiving the request, the authorization server 101 performs method 200 under the "re-qualify" condition (i.e., by performing method 320 as part of step 209) and returns, in step 211, lists of the products and services of the user that are and are not re-qualified. The application server 103 generates a web-page for display to the user informing the user whether all of the user's products and services re-qualify, or whether one or more of the user's products or services do not re-qualify and must therefore be changed or cancelled as a result of the account-related change.

Finally, upon identifying in step 207 that an "eligibility" condition applies, the authorization server proceeds to step 209 to perform the process of method 340 of FIG. 3C. Under this condition, the search of the rule-set map table seeks to identify a rule-set in which each entry of the rule-set that is associated with the Eligibility condition (i.e., rows with the flag "Y" in the eligibility column) evaluate as true. In the case of an eligibility condition, the search of the product rule-set map can be limited to products that the customer already has or is adding (e.g., in a situation in which the user is currently adding new products) and the corresponding rule-set—and the processing thus identifies the customer's current product(s) (notably product 5555, in the present example) and the associated rule-set (the customer was authorized for product 555 via rule-set 1122) in step 341. In view of the customer having been authorized through rule-set 1122, the rule-set map table (Table 7) is searched in step 343 to identify the rule(s) forming part of the rule-set identified in step 341 (i.e., rule-set 1122 in our example) that are applied under the Eligibility condition. The search of step 343 returns rule 333, which forms part of rule-set 1122 and is associated with the eligibility condition. In turn, as part of the eligibility authorization process, the authorization server 101 searches the customer true set table (Table 3) in step 345 for entries matching the returned rule (rule 333). In the present case, Line ID 123456999 is thus identified as being eligible for use with product 5555. As part of searching the customer true set table (Table 3), if the matching entry has a Line ID of zero then the all service lines of the customer are determined to be eligible for the product. However, if the matching entry has a non-zero Line ID, then only the service line(s) identified by the Line ID are determined to be eligible for the product. In one example, a customer can be presented with an alert specifically identifying lines of service that are not eligible (e.g., "Notice: Line '123456789' is not eligible for this product/service"). In another example, lines of service that are eligible are identified by one icon (e.g., a green checkmark) while lines of service that are not eligible are identified by a different icon (e.g., a red 'X').

Returning to our example of the user having selected the upgrade eligibility option in an on-line store website provided by the application server 103, the user may select via the website an option to upgrade the customer's wireless service plan to one of the products presented to the user following the "eligibility" authorization. In response to the selection, the application server 103 generates a second authorization request to determine which of the customer's lines of service are eligible for the upgrade. The application server 103 may thus generate and transmit to the authorization server 101 a second product authorization request identifying the selected wireless service plan. In response to receiving the request, the authorization server 101 performs method 200 under the "eligibility" condition and returns, in step 211, a list of the customer's products or services that are eligible for the selected service plan. The application server 103 generates a display screen for display to the user via the website including the product eligibility information. The product eligibility information can, for example, notify the customer that only the customer's lines of service associated with mobile telephones are eligible for a new telephone service plan, while lines of service associated with tablet computers are not eligible for the selected plan, for example.

As detailed in relation to methods 200, 300, 320, and 340, the rule-set map table is searched to find out which products to display to a customer (e.g., in method 300), and also searched to find out what rules we need to validate for existing customer products (e.g., in methods 320 and 340). However, dependent on the particular condition identified in the authorization request, different sub-sets of rules in each rule-set of the rule-set map table are considered. Additionally, once one authorization process is completed under one authorization condition (e.g., at the completion of step 209 or 211), the authorization server can proceed to perform an authorization under a different authorization condition either by returning to step 201 or step 209, for example.

The use examples described in relation to FIGS. 2 and 3A-3C have focused on situations in which the customer information (e.g., retrieved in step 203) and rules (e.g., applied in step 205 and 209) centered on a customer's mobile wireless service account information. More generally, however, the customer information and rules used as part of a product/service authorization procedure can relate to other types of information. In one example, the authorization may be based on a date and/or time (e.g., a current date and/or time, or a date and/or time of an authorization request), based on a channel through which the authorization request was submitted (e.g., whether the authorization was obtained from a user accessing a website, from a customer service representative assisting a customer over the phone, from a sales representative assisting a customer in a retail store, or the like), based on a current condition of the system (e.g., whether the authorization server 101, a user device 111, or other component of the system is starting operation, running, or shutting down), or the like. In other examples, a retailer may have access to information on a customer's (or potential customer's) other purchases and possessions, interests, habits, affinity groups, or the like. The retailer may use such information as a basis for authorizing the customer for products or services by establishing rules relating to such other sources of information in accordance with the principles detailed above. For example, the retailer may establish rules, rule-sets, and mapping tables such that customers who have joined a "Star-Wars" affinity group are authorized for purchase of a special edition "Star-Wars" mobile device; such that customers who are known to be frequent international travelers are authorized for purchase of an international roaming service plan; or the like. In such examples, the customer information retrieved in step 203 will include information on the relevant additional criteria used for qualification.

The illustrative example detailed above included a limited number of rules, criteria, rule-sets, authorization conditions, and products. In general, the authorization systems and services described herein are configured to function efficiently for much larger numbers of rules, criteria, rule-sets, authorization conditions, and products. Additionally, each of the tables and maps can be readily expanded to include additional rules, rule-sets, and products, and to reuse previously defined rules and rule-sets in defining authorization conditions for new products. To this end, the authorization server 101 can provide a suite of user interfaces to enable a user to create new rules, rule-sets, and products. The suite of user interface can further enable the user to manipulate rules and rule-sets, to modify mappings (e.g., mappings of criteria to rules, of rules to rule-sets, or rule-sets to products, or the like), and/or to create a new rule or rule-set by applying a modification to an existing rule or rule-set. By readily enabling the user to update the authorization tables and mappings, business and revenue accounting personnel can create complicated conditions for authorization and sale, validation, and eligibility.

In providing the authorization service as detailed above, the authorization server 101 can use custom code or can perform table-driven processing (e.g., using SQL programming and databases). In some embodiments, the authorization server 101 is implemented on both Java Appservers and COBOL mainframes, and the processing performed by the authorization server 101 can be implemented in two ways to allowing for rules evaluation to be performed on two different machine architectures.

First in order to embed the evaluation of the rules into a COBOL query, a global temporary table is constructed that tracks which rules evaluate as true, with a breakdown by account or line level. On the mainframe, this can be accomplished by processing each rule in turn, using the criteria code to determine which fields to examine in the customer record and evaluating it against the rules criteria values. If the rule evaluates as true for an account attribute, a single entry is made; if it is a line attribute, an entry is made for each line that evaluates as true. This produces a temporary session based result set that can then be used to query against the product rule-set map table above, to determine either availability, qualification, eligibility or re-qualification.

In the Java environment, each class of criterion is broken out into a session bean that loads only the rules for that criterion into memory. In our example, a bean may be used for processing Area, another bean may be used for processing Device, and a third bean may be used for processing customer type. A series of request beans examine the customer record, extract the criteria needed by each bean, and pass the extracted data as attributes for each line identifier (in the case of line-specific data) or as attributes with a null line identifier (in the case of account level criteria). Each bean then returns an array of rules that evaluate as true, each rule being associated with the corresponding line identifier (or null line identifier). This is consolidated by the request bean into a true-set that can then be used in the same way as the customer true set table (table 3) above.

As detailed in the above discussion, functions relating to the enhanced product authorization service may be implemented on computers, connected for data communication via the components of a packet data network, operating as an authorization server 101, an application server 103, and/or user devices 111*a-d* as shown in FIG. 1. Although special purpose devices may be used, such devices also may be implemented using one or more hardware platforms intended to represent a general class of data processing devices commonly used to run "server" programming so as to implement the product authorization functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives, etc.) for code and data storage, and one or more network interface cards or ports for communication purposes. The software functionalities involve programming, including executable code as well as associated stored data, e.g. files used for storing the table data detailed above. The software code is executable by the general-purpose computer that functions as the authorization server 101, the application server 103, and/or that functions as a user devices 111*a-d*. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for product authorization, in essentially the manner performed in the implementations discussed and illustrated herein.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. Of course, the server functions may be implemented in a distributed fashion on a number of similar platforms, to distribute the processing load.

Hence, aspects of the methods of product authorization service outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives, and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the retailer or service provider into the computer platform of the computer that will be the authorization server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:
1. A method comprising:
receiving, via a communication network in an authorization server communicatively coupled to the communication network, first and second requests to authorize a customer for a product or service, wherein the first and second requests each include customer information and respectively include identifiers for first and second authorization conditions;
identifying, in the authorization server based on identification of at least one of the product or service and the customer information, a plurality of entries of a table of authorization rules that pertain to authorizing the customer for the product or service by:
identifying a rule-set associated with the product or service from among a plurality of rule-sets stored in the table of authorization rules, the identified rule-set including
a first plurality of authorization rules that must be satisfied to authorize the customer for the product or service under the first authorization condition, and
a second plurality of authorization rules that is different from the first plurality of authorization rules and that must be satisfied to authorize the customer for the same product or service under the second authorization condition, and
identifying, for each entry in the plurality of entries, an authorization rule included in the first and second pluralities of authorization rules based on optimized database queries into the table of authorization rules using integer pairings that are contained within the table of authorization rules and that pair an identifier of the rule-set with respective identifiers of the authorization rules in the first and second pluralities of authorization rules,
wherein a first subset of the identified plurality of entries include a flag associated with the first authorization condition, and
wherein a second subset of the identified plurality of entries different from the first subset of entries include a flag associated with the second authorization condition; and
determining, based on the table of authorization rules, whether the customer is authorized for the product or service by
determining whether the identified at least one of the product or service and the customer information satisfy all of the identified plurality of entries included within the first subset of entries that include the flag associated with the first authorization condition, and determining whether the identified at least one of the product or service and the customer information satisfy all of the identified plurality of entries included within the second subset of entries that include the flag associated with the second authorization condition;

wherein the determining of whether the customer is authorized for the product or service is performed using at least one of a mainframe in which the authorization rules are evaluated by way of a query associated with a temporary session-based table that tracks which authorization rules evaluate as true with a breakdown by account or line level and that is used by the query to determine at least one of an availability, a qualification, an eligibility, and a requalification of at least one of the customer, the product, and the service, and a Java appserver in which each criterion included in a plurality of customer criteria imposed under at least one of the first and second authorization conditions is broken out into a separate session bean that loads the authorization rules for the criterion into memory, and in which the first and second requests are associated with request beans configured to consolidate authorization rules that evaluate as true and are returned by each of the separate session beans.

2. The method of claim 1, wherein the identifying the plurality of entries of the table of authorization rules is further performed by:

identifying, based on the customer information, a plurality of rules that are satisfied by the customer information from among a plurality of rules stored in a rule criteria value table, wherein each of the plurality of rules stored in the rule criteria value table is satisfied when at least one criterion associated with the rule is satisfied, and wherein the identified plurality of rules form a customer true set; and identifying, based on the identified plurality of rules forming the customer true set, one or more rule-sets that are satisfied by the customer true set, wherein the table of authorization rules is a rule-set map table identifying, for each rule-set in the plurality of rule-sets stored in the table of authorization rules, one or more rules included within the plurality of rules stored in the rule criteria value table.

3. The method of claim 2, wherein a particular rule-set is satisfied under a particular authorization condition when each of the one or more rules included in the particular rule-set and identified by a flag associated with the particular authorization condition are satisfied by the customer information.

4. The method of claim 3, wherein the identified plurality of entries of the table of authorization rules form part of the identified rule-set.

5. The method of claim 4, wherein the first and second subsets of entries included within the identified plurality of entries form part of the identified rule-set.

6. The method of claim 2, wherein different rule-sets are associated with different products or services, and the customer is authorized for a particular product or service when the customer information of the customer satisfies a rule-set associated with the particular product or service.

7. The method of claim 1, wherein the identifying of the plurality of entries of the table of authorization rules is further performed by:

identifying, based on the customer information, a particular product or service associated with an account of the customer;

identifying the plurality of entries of the table of authorization rules that pertain to authorizing the customer for the particular product or service;

identifying, from among the identified plurality of entries of the table of authorization rules, the first subset of the identified plurality of entries that include the flag associated with the first authorization condition; and determining, based on the table of authorization rules, that the customer is authorized for the particular product or service under the first authorization condition by determining that the customer information satisfies all of the entries in the first subset of the identified plurality of entries.

8. The method of claim 1, wherein the first request to authorize the customer for the product or service is received in response to the customer selecting via a user device an option to view products and services for which the customer is authorized, the method further comprising:

returning for display to the user via the user device identification of the product or service upon determining that the customer is authorized for the product or service under the first authorization condition.

9. The method of claim 7, wherein the identifying the plurality of entries of the table of authorization rules that pertain to authorizing the customer for the particular product or service is further performed by:

identifying, based on a product rule-set map table, one or more rule-sets associated with the identified particular product or service, wherein the identified plurality of entries of the table of authorization rules are entries of the table of authorization rules associated with the identified rule-sets.

10. A system comprising:

an application server communicatively connected via a communication network to a plurality of user devices, and configured to provide to users of the plurality of user devices an application service providing the users with information on individual users' authorization for products or services; and an authorization server communicatively connected via the communication network to the application server and configured to provide to the application server the information on the individual users' authorization for the products or services;

wherein the authorization server is further configured, in response to receiving from the application server first and second requests to authorize a customer for a product or service, to perform functions to:

identify, based on identification of at least one of the product or service and customer information included in the first and second requests, a plurality of entries of a table of authorization rules that pertain to authorizing the customer for the product or service by identifying a rule-set associated with the product or service from among a plurality of rule-sets stored in the table of authorization rules, the identified rule-set including a first plurality of authorization rules that must be satisfied to authorize the customer for the product or service under the first authorization condition, and a second plurality of authorization rules that is different from the first plurality of authorization rules and that must be satisfied to authorize the customer for the same product or service under the second authorization condition, and identifying, for each entry in the plurality of entries, an authorization rule included in the first and second pluralities of authorization rules based on optimized database queries into the table of authorization rules using integer pairings that are contained within the table of authorization rules and that pair an identifier of the rule-set with respective identifiers of the authorization rules in the first and second pluralities of authorization rules, wherein a first subset of the identified plurality of entries include a flag associated with a first authorization condition identified in the first request, and wherein a second subset of the identified plurality of entries different from the first subset of entries include a flag associated with a second authorization condition identified in the second request, and determine, based on the table of authorization rules, whether the customer is authorized for the product or service by determining whether the identified at least one of the product or service and the customer information satisfy all of the identified plurality of entries included within the first subset of entries that include the flag associated with the first authorization condition, and determining whether the identified at least one of the product or service and the customer information satisfy all of the identified plurality of entries included within the second subset of entries that include the flag associated with the second authorization condition; and wherein the authorization server is implemented by at least one of a mainframe in which the authorization rules are evaluated by way of a query associated with a temporary session-based table that tracks which authorization rules evaluate as true with a breakdown by account or line level and that is used by the query to determine at least one of an availability, a qualification, an eligibility, and a requalification of at least one of the customer, the product, and the service, and a Java appserver in which each criterion included in a plurality of customer criteria imposed under at least one of the first and second authorization conditions is broken out into a separate session bean that loads the authorization rules for the criterion into memory, and in which the first and second requests are associated with request beans configured to consolidate authorization rules that evaluate as true and are returned by each of the separate session beans.

11. The system of claim 10, wherein the authorization server is further configured to identify the plurality of entries of the table of authorization rules by:

identifying, based on the customer information, a plurality of rules that are satisfied by the customer information from among a plurality of rules stored in a rule criteria value table, wherein each of the plurality of rules stored in the rule criteria value table is satisfied when at least one criterion associated with the rule is satisfied, and wherein the identified plurality of rules form a customer true set; and identifying, based on the identified plurality of rules forming the customer true set, one or more rule-sets that are satisfied by the customer true set, wherein the table of authorization rules is a rule-set map table identifying, for each rule-set in the plurality of rule-sets stored in the table of authorization rules, one or more rules included within the plurality of rules stored in the rule criteria value table.

12. The system of claim 11, wherein a particular rule-set is satisfied under a particular authorization condition when each of the one or more rules included in the particular rule-set and identified by a flag associated with the particular authorization condition are satisfied by the customer information.

13. The system of claim 12, wherein the identified plurality of entries of the table of authorization rules form part of the identified rule-set.

14. The system of claim 13, wherein the first and second subsets of entries included within the identified plurality of entries form part of the identified rule-set.

15. The system of claim 11, wherein different rule-sets are associated with different products or services, and the customer is authorized for a particular product or service when the customer information of the customer satisfies a rule-set associated with the particular product or service.

16. The system of claim 10, wherein the authorization server is further configured to identify the plurality of entries of the table of authorization rules by:

identifying, based on the customer information, a particular product or service associated with an account of the customer;

identifying the plurality of entries of the table of authorization rules that pertain to authorizing the customer for the particular product or service;

identifying, from among the identified plurality of entries of the table of authorization rules, the first subset of the identified plurality of entries that include the flag associated with the first authorization condition; and determining, based on the table of authorization rules, that the customer is authorized for the particular product or service under the first authorization condition by determining that the customer information satisfies all of the entries in the first subset of the identified plurality of entries.

17. The system of claim 10, wherein the first request to authorize the customer for the product or service is received in response to the customer selecting via a user device an option to view products and services for which the customer is authorized, wherein the authorization server is further configured to:
return to the application server for display to the user via the user device identification of the product or service upon determining that the customer is authorized for the product or service under the first authorization condition.

18. The system of claim 16, wherein the authorization server is further configured to identify the plurality of entries of the table of authorization rules that pertain to authorizing the customer for the particular product or service by:

identifying, based on a product rule-set map table, one or more rule-sets associated with the identified particular product or service, wherein the identified plurality of entries of the table of authorization rules are entries of the table of authorization rules associated with the identified rule-sets.

\* \* \* \* \*